(12) United States Patent
Elsmark et al.

(10) Patent No.: US 7,798,842 B2
(45) Date of Patent: Sep. 21, 2010

(54) CONNECTOR PLUG FOR A MULTI-CONDUCTOR CABLE WITH TENSION LOAD TRANSFERRING MEANS

(75) Inventors: Karl Johan Lars Elsmark, Saltsjö-Boo (SE); Kjell Ola Tobias Syvertsson, Sollentuna (SE)

(73) Assignee: Atlas Copco Tools AB, Nacka (SE)

( * ) Notice: Subject to any disclaimer, the term of this patent is extended or adjusted under 35 U.S.C. 154(b) by 0 days.

(21) Appl. No.: 12/529,259

(22) PCT Filed: Feb. 28, 2008

(86) PCT No.: PCT/SE2008/000164

§ 371 (c)(1), (2), (4) Date: Aug. 31, 2009

(87) PCT Pub. No.: WO2008/108705

PCT Pub. Date: Sep. 12, 2008

(65) Prior Publication Data

US 2010/0055970 A1 Mar. 4, 2010

(30) Foreign Application Priority Data

Mar. 2, 2007 (SE) .................................. 0700509

(51) Int. Cl.
*H01R 13/58* (2006.01)
(52) U.S. Cl. .................. 439/452; 439/455; 439/580
(58) Field of Classification Search ............... 439/452, 439/455, 465, 469, 471, 474, 580, 582, 459
See application file for complete search history.

(56) References Cited

U.S. PATENT DOCUMENTS

| | | | |
|---|---|---|---|
| 3,060,260 A | 10/1962 | Scofield | |
| 5,750,932 A | 5/1998 | Hansson | |
| 7,163,417 B2* | 1/2007 | Brodin | 439/457 |
| 7,202,417 B2* | 4/2007 | Marszalek et al. | 174/113 R |
| 2004/0203285 A1 | 10/2004 | Brancaleone | |
| 2006/0057885 A1 | 3/2006 | Brodin | |
| 2010/0018746 A1* | 1/2010 | Elsmark | 174/117 F |

OTHER PUBLICATIONS

English Language International Search Report dated May 28, 2008 issued in parent Appln. No. PCT/SE2008/000164.

* cited by examiner

*Primary Examiner*—Hae Moon Hyeon
(74) *Attorney, Agent, or Firm*—Frishauf, Holtz, Goodman & Chick, P.C.

(57) ABSTRACT

A connector plug is provided for a multi-conductor cable with an axial load transferring non-conducting tensile string. The connector plug includes a casing carrying a number of contact elements attached to conductors of the cable for engaging corresponding contact elements connected to a matching jack, and the tensile string is anchored relative to the casing via an annular element mounted at the end of the cable. A transverse pin is firmly attached to the tensile string of the cable and positively engages the annular element. The annular element has a rim portion with a bigger outer diameter than an outer cross sectional dimension of the cable so as to engage an internal shoulder on the casing and enable transfer of axial load from the tensile string of the cable to the casing and further to a connected matching jack via the transverse pin and the annular element.

5 Claims, 2 Drawing Sheets

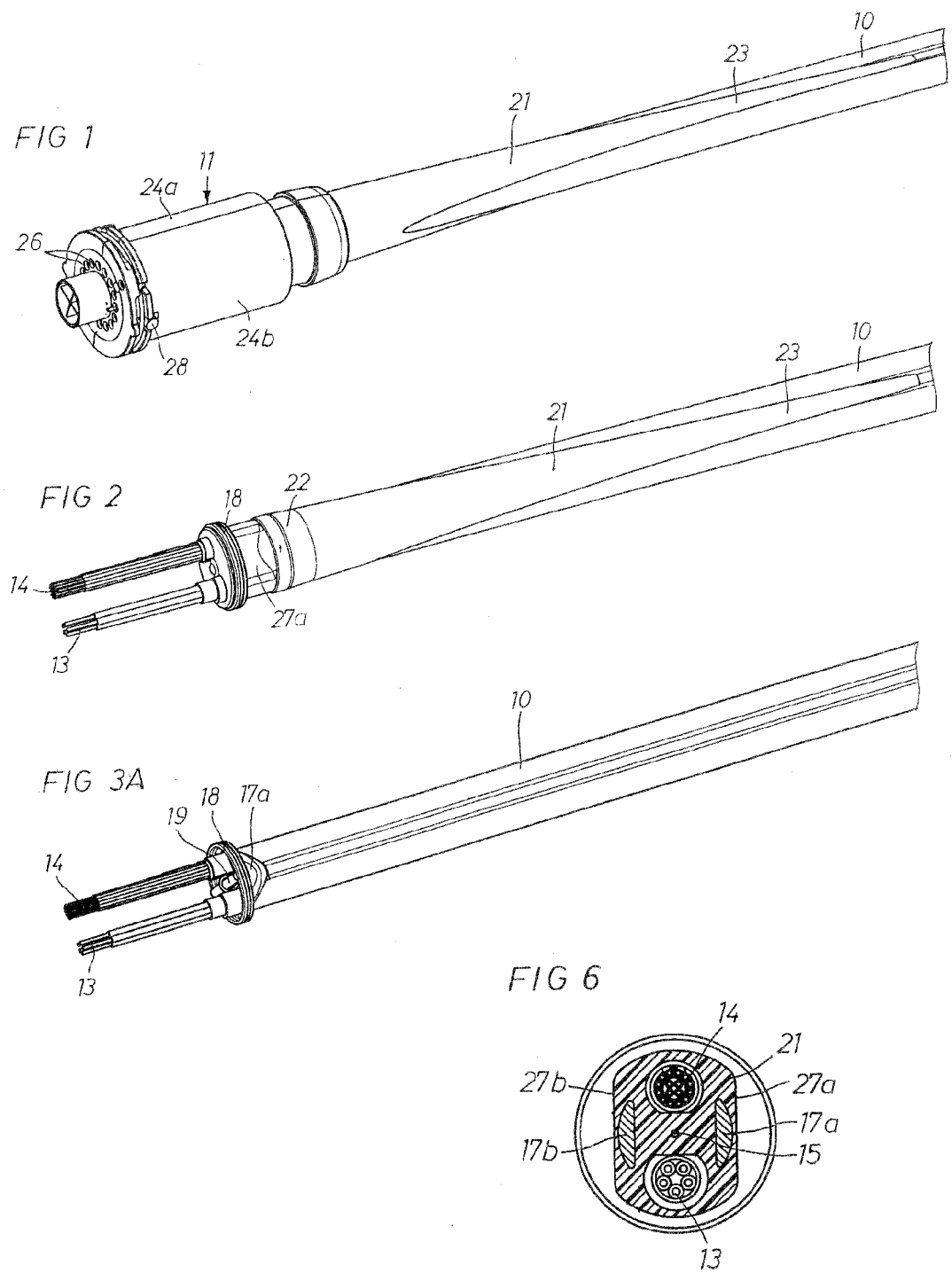

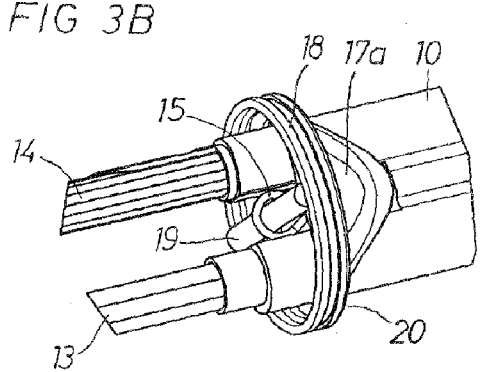
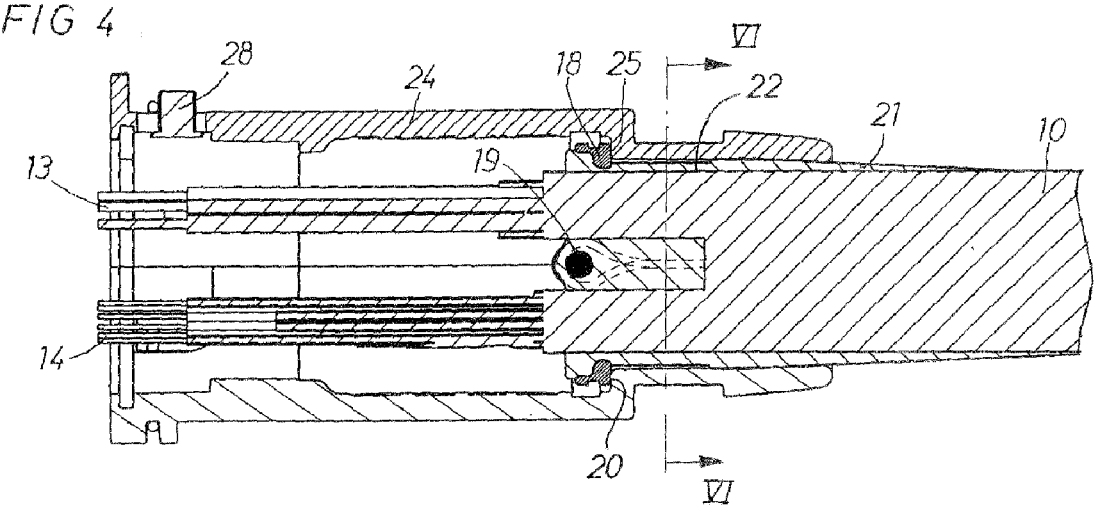
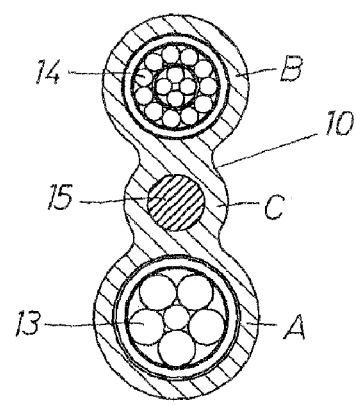

CONNECTOR PLUG FOR A MULTI-CONDUCTOR CABLE WITH TENSION LOAD TRANSFERRING MEANS

CROSS-REFERENCES TO RELATED APPLICATIONS

This application is a U.S. National Phase Application under 35 USC 371 of International Application PCT/JP2008/000164 filed Feb. 28, 2008.

BACKGROUND OF THE INVENTION

The invention relates to a connector plug for connecting a multi-conductor cable to a matching jack for establishing transmission of electrical power and/or signals between a mobile equipment and a stationary unit. Particularly, the invention concerns a connector plug for a multi-conductor cable having a tension load transferring means with the purpose to protect and relieve the conductors of the cable from tension loads to which the cable may be exposed at handling of the mobile equipment. Cables of this type are suitable for interconnection of an electric power tool and a stationary drive and control unit.

A previously known multi-conductor cable of the above type, described in for instance U.S. Pat. No. 5,750,932, comprises three sections in a flat configuration, wherein one section contains a number of power conductors for energizing a power tool, a second section containing a number of signal conductors, and a third section located between the other two sections and containing a non-conducting tension load transferring string or rope of a suitable high strength material like Kevlar.

A problem concerned with cables of the above described type is to obtain a safe enough anchorage of the tension load transferring string in a connector plug and to ensure a proper transfer of tension load to the connector plug and further to a connected jack, either on a mobile equipment or on a stationary unit.

SUMMARY OF THE INVENTION

The main object of the invention is to provide a multi-conductor cable with a tension load transferring string which is anchored in a connector plug connected to the cable in a way that safely locks the tension load transferring string relative to the connector plug and which does not expose the connector plug housing to heavy strains but permits the connector plug housing to be made of a low tensile material like a plastic.

Further objects and advantages of the invention will appear from the following specification and claims.

A preferred embodiment of the invention is described in detail below with reference to the accompanying drawings.

BRIEF DESCRIPTION OF THE DRAWINGS

In the drawings

FIG. 1 shows a perspective view of a flat type multi-conductor cable with a connector plug according to the invention.

FIG. 2 shows a perspective view of the multi-conductor cable illustrating the axial load transferring means and with the external mould removed.

FIG. 3 A shows a perspective view of the multi-connector cable illustrating the anchoring means for the axial load transferring string and with the outer plug casing and the external mould removed.

FIG. 3 B shows on a larger scale the cable end portion of FIG. 3 A.

FIG. 4 shows a longitudinal section through the cable and a connector plug illustrating the anchoring means for the axial load transferring string.

FIG. 5 shows a cross section through a multi-conductor cable with an axial load transferring string.

FIG. 6 shows a cross section along line VI-VI in FIG. 4.

DETAILED DESCRIPTION OF THE INVENTION

The device illustrated in the drawings comprises a multi-conductor cable 10 connected to a connector plug 11 for connection to a non-illustrated matching connector jack. As shown in FIG. 5 the multi-conductor cable 10, which is of previously known type, consists of three sections, namely a first section A comprising a number of power transmitting wires 13, a second section B comprising a number of signal transferring wires 14, and a third section C disposed between the first and second sections A and B, respectively, and comprising a non-conductive load transferring tensile string 15. The latter consists of a high strength material like Kevlar and is intended to transfer any axial load to which the cable 10 may be exposed during use, thereby protecting the electric wires 13 and 14 from mechanical strain and possible rupture which would be costly for the user of the cable, both due to repair or exchange of the cable and due stop of production. As mentioned above, this type of cable is described in U.S. Pat. No. 5,750,932.

An important part of the axial load transferring means is the anchoring of the tensile string 15 relative to the connector plug 11 such that the axial load could be properly transferred to the jack to which the plug 11 is connected. To that end the cable 10 is provided with a load transferring device including an annular element 18 mounted at the end of the cable 10 and extending in a plane transverse to the longitudinal direction of the cable 10, and a transverse pin 19 firmly attached to the load transferring string 15 and disposed across and positively engaging the annular element 18. The annular element 18 has an outer rim portion 20 which has a bigger outer diameter than the biggest outer cross sectional dimension of the cable 10. The annular element 18 is provided with two axially extending wings 17 a,b which together with the entire annular element 18 are integrated with and secured to the cable 10 by a reinforcement mould 21 applied on the cable 10. The wings 17 a,b are intended to form a lock means for rotationally locking the annular element 18 relative to the cable 10.

The mould 21 comprises a cylindrical portion 22 with a circular cross section located adjacent the end of the cable 10 for facilitating connection of the cable to the connector plug 11, and two tapering tongues 23 extending along and on each side of the cable 10 in a direction away from the cylindrical portion 22 such that the cable 10 successively resumes its original flat shape. The mould 21, which is applied on the cable 10 after mounting of the annular element 18 and the transverse pin 19, covers both sides of the annular element 18 and embeds and fixes the transverse pin 19 in its proper position relative to the annular element 18. See FIG. 2.

As illustrated in FIGS. 1 and 4, the connector plug 11 comprises an outer casing 24 with an internal annular shoulder 25 which is arranged to engage the rim portion 20 of the annular element 18 to transfer axial load from the tensile string 15 to the connector plug 11 via the transverse pin 19 and the annular element 18. Accordingly, when the plug 11 is connected to a matching jack axial load to which the cable may be exposed will be transferred from the plug casing 24 to that jack and to the structure on which the jack is mounted, whereby the wires 13,14 of the cable 10 are safely prevented from being exposed to any detrimental axial strain. At its front end the casing 24 of the plug 11 carries a number of contact elements 26 attached to the wires 13,14 of the cable 10 and intended to engage corresponding contact elements on a matching jack. The casing 24 also comprises a retaining means 28 for engaging a matching device on a matching jack for safely locking the plug 11 to the jack.

Moreover, the plug casing 24 consists of two halves 24 *a,b* to be mounted around the end portion of the cable 10, and the cylindrical portion 22 of the mould 21 is formed with two flat portions 27 *a,b* intended to form a rotation locking means for co-operation with corresponding non-illustrated flat portions on the casing halves 24 *a,b* to thereby rotationally lock the casing 24 to the cable 10. See FIG. 6. Accordingly, the wings 17 *a,b* on the annular element 18 and the flat portions 27 *a,b* serve together with the non-illustrated flat portions on the casing halves 24 *a,b* to rotationally lock the cable 10 to the plug casing 24.

What is claimed is:

1. A connector plug for a multi-conductor cable with an axial load transferring non-conducting string, comprising:

a casing with a number of contact elements connected to the conductors of the cable for engaging connector elements on a matching jack, wherein the tension load transferring string is anchored relative to the casing via a load transferring device, and wherein the load transferring device comprises:

an annular element mounted at the end of the cable and extending in a plane transverse to the longitudinal direction of the cable, said annular element having an outer rim portion with a diameter bigger than the outer cross sectional dimension of the cable, a transverse pin disposed across and engaging the annular element and being firmly attached to the load transferring string, and an annular shoulder in the casing arranged to be engaged by said rim portion to transfer axial load from the load transferring string to the casing.

2. The connector plug according to claim 1, wherein the cable is a flat type cable comprising separated first and second sections for power conductors and signal conductors, respectively, and a central section located between said first and second sections and comprising the tensile string.

3. The connector plug according to claim 1, wherein the end portion of the cable, said annular element and said transverse pin are integrated in a mould of a resinous material applied externally on the cable.

4. The connector plug according to claim 3, wherein said mould is formed with a cylindrical portion with circular cross section adjacent the end of the cable and two tapering tongues extending along the cable from said cylindrical portion.

5. The connector plug according to claim 2, wherein the end portion of the cable, said annular element and said transverse pin are integrated in a mould of a resinous material applied externally on the cable.

* * * * *